Oct. 19, 1926.
T. AMUNDSON
DRAWBAR FOR TRACTORS
Filed Jan. 18, 1926
1,603,931
2 Sheets-Sheet 2
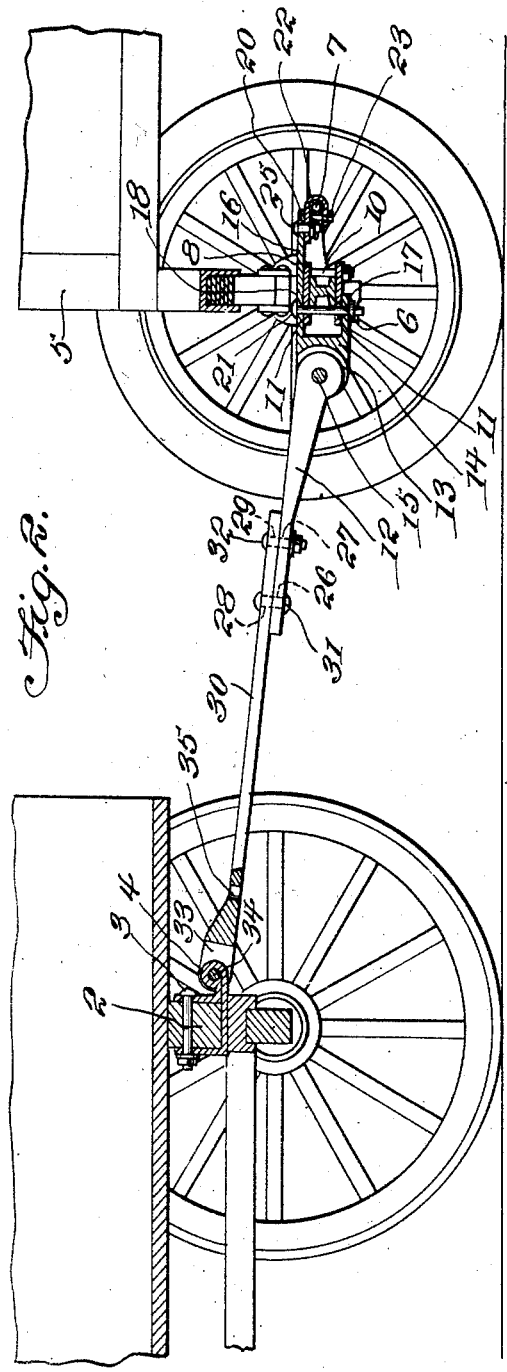
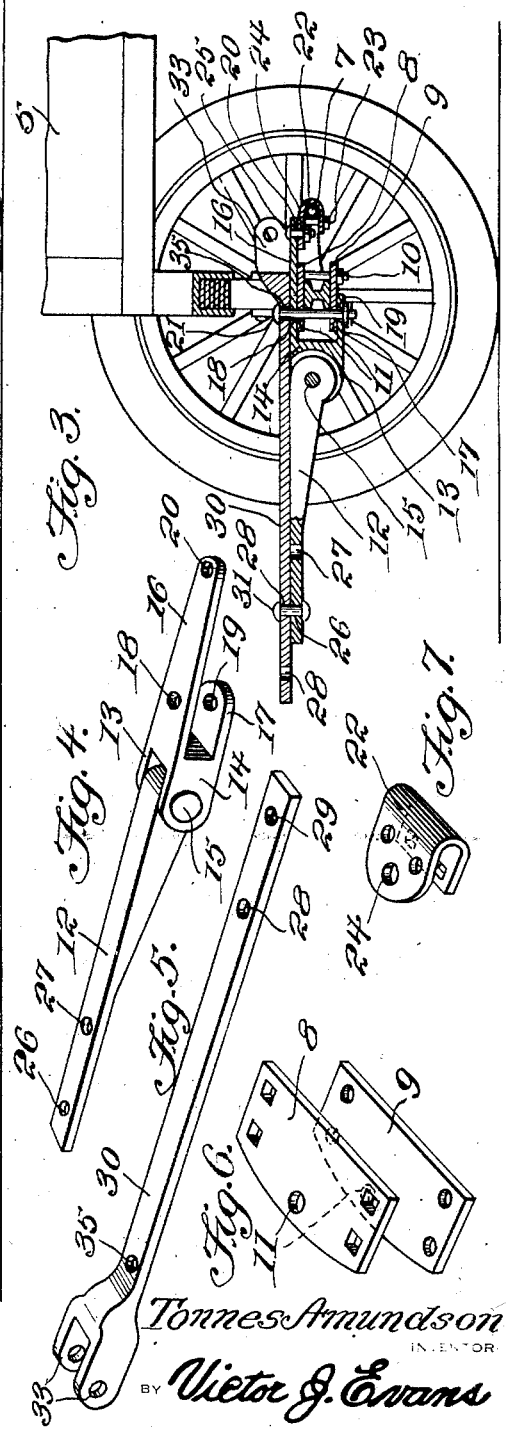
Tonnes Amundson
INVENTOR
BY Victor J. Evans
ATTORNEY Patented Oct. 19, 1926.

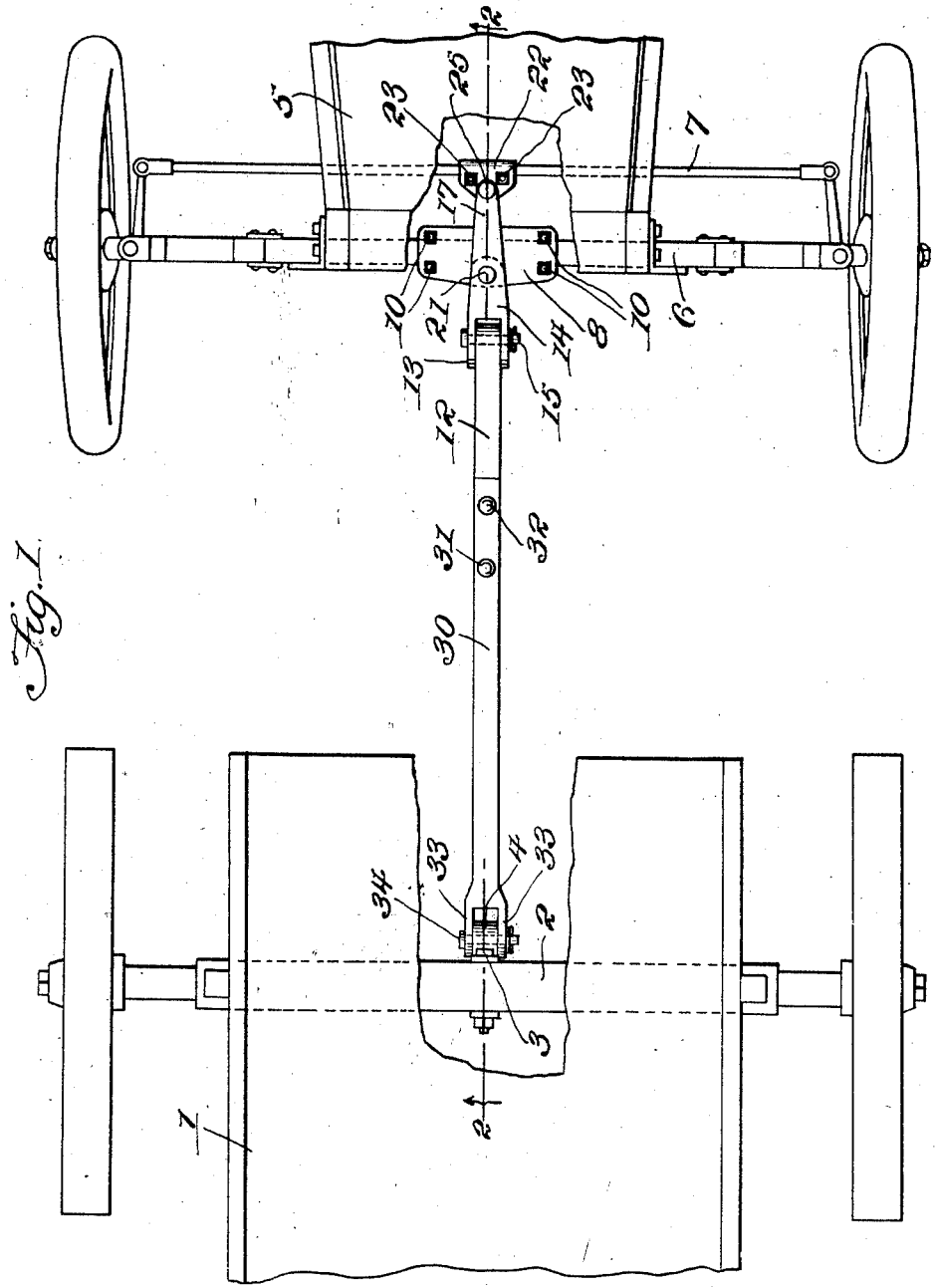

1,603,931

UNITED STATES PATENT OFFICE.

TONNES AMUNDSON, OF HILLSBORO, NORTH DAKOTA.

DRAWBAR FOR TRACTORS.

Application filed January 18, 1926. Serial No. 82,152.

In farming a tractor is commonly employed for pulling machinery and farm wagons or trucks to places in fields where such tractor and machinery are to be used. These places are very frequently remote from the farm house and occasions often occur where it is necessary for a hand, or supervisor to return from the field to the farm house or to make other trips necessary in conducting the work. It may therefore be considered the primary object of this invention to provide a draw bar between a motor actuated vehicle, such as is used by the superintendent or the like and a truck or other vehicle which is drawn to the work by the tractor, so that the first mentioned vehicle may be readily detached from the remainder of the train of vehicles and employed for making return trips to the farm house, trips necessary in other parts of the field, and as a matter-of-fact, any journeys necessary or desirable in farming pursuits.

A further object is the provision of a draw bar for this purpose which can be easily attached to a vehicle or implement which is drawn by a tractor and to a motor propelled vehicle, and which is of a construction as to permit of a vertical yielding between the two vehicles, incident to the passage thereof over rough ground, but which will accurately guide the drawn vehicle so that the same will accurately pursue the path taken by the remainder of the train of vehicles.

A still further object is the provision of a draw bar for this purpose which, when not required for use, may remain a fixture on the motor propelled vehicle and which will in no wise interfere with the steering or propulsion of such vehicle.

A still further object is the provision of a draw bar for this purpose that is of a simple construction, cheaply manufactured, easily installed, and thoroughly efficient for its purposes.

To the attainment of the foregoing objects and others which will appear as the nature of the invention is better understood, the improvement further resides in certain novel features of construction, combination and operative association of parts, a satisfactory embodiment of which is illustrated by the accompanying drawings.

In the drawings:

Figure 1 is a top plan view illustrating the application of the improvement, parts being broken away.

Figure 2 is a sectional view approximately on the line 2—2 of Figure 1.

Figure 3 is a sectional view illustrating the arrangement of parts constituting the draw bar when the latter is not attached to a draft vehicle.

Figure 4 is a perspective view of one of the elements constituting the draw bar.

Figure 5 is a similar view of the second draw bar section.

Figure 6 is a perspective view of the plates employed.

Figure 7 is a similar view of the plate.

While in the following description I have referred to my improved draw bar in connection with farming implements and ordinary motor propelled vehicles, it is to be understood that I do not wish to be restricted to this particular use, as the draw bar may be successfully employed in connection with other vehicles.

In the drawings, the numerals 1 designates a farm wagon from which the draft animals are detached and which is designed to be hitched to any wheeled farming implement that in turn is hitched to a tractor. To the rear bolster 2 of the wagon 1, I attach a bracket. The bracket has a substantially U-shaped body whose parallel arms are disposed for contact with the opposite sides of the bolster and through these arms and through the bolster there is passed a securing element 3, such as a bolt on which is threaded a nut. The bracket, at its lower and rear corner is formed with an outwardly extending eye 4.

The motor driven vehicle to be drawn by the train of vehicles to which the tractor is attached is preferably of the ordinary small type of automobiles commonly known as the Ford, although, it will be apparent as the description progresses that the improvement may be applied upon other types of automobiles. The motor driven vehicle or automobile is broadly indicated by the numeral 5, the front axle therefor by the numeral 6 and the steering knuckle connecting rod by the numeral 7. On the upper and lower faces of the axle, at the center thereof, there are arranged plates 8 and 9, respectively, best shown in Figure 6. These plates have passed therethrough, preferably adjacent to the corners thereof, bolt members 10 engaged by the ordinary nuts, and these bolts are in contacting engagement with the inner and outer faces of the channeled axle 6. This frictional engagement of the bolts with the axle hold the plates against movement in any direction on said axle. By reference to the drawings it will be seen that the outer edges of the plates are rounded inwardly from the center to the ends thereof, and these portions of the plates are provided with aligning openings 11.

The numeral 12 designates a draw bar section. This member 12 has its upper face flat, but is increased in thickness from a point a distance from one of its ends to its other end, and the widened or thickened end is rounded. This rounded end is received in a bifurcation 13 formed on one end of a block member 14. A pivot 15 passes through the arms provided by the bifurcation for hingedly securing the draw bar member 12 to the block. The block, on the rear face thereof, has upper and lower rearwardly extending arms 16 and 17, respectively. The arm 17 is of a materially less length than the arm 16 and both the arms 16 and 17 are provided with aligning openings 18 and 19, respectively, while the arm 16 has a second opening 20, adjacent to its outer end. The arms 16 and 17 of the block 14 are designed to be respectively arranged over the plates 8 and 9, and a removable pivot 21 passes through the aligning openings 18 and 19 and through the openings 11 in the plates 8 and 9. Around the steering connecting rod 7 there is arranged a substantially U-shaped clip 22. This clip is firmly bolted on the rod 17, as indicated by the numerals 23. The upper arm or member of the clip is extended a suitable distance beyond the lower arm thereof and is provided with an opening 24 designed to register with the opening 20 in the arm 16 of the block member 14 and these openings have passed therethrough a removable pivot 25. It is, of course, to be understood that suitable means hold the pivots 21 and 25 against accidental movement.

The draw bar 12, at the comparatively thin outer end thereof, is provided with two spaced openings 26 and 27, respectively, and these openings are designed to register with openings 28 and 29 respectively, in the second or outer draw bar section or member 30. Passing through the aligning openings 26 and 28 of the draw bar sections there is a fixed pivot 31 and passing through the openings 27 and 29 in the sections there is holding means 32. The means 32 is preferably in the nature of a bolt that is engaged by a nut.

The outer or free end of the draw bar section 12 is widened and is bifurcated to provide spaced arms 33. These arms receive therebetween the eye 4 on the clip that is attached to the bolster 2, and a removable pivot 34 passes through the arms 33 and through the eye 4.

With a draw bar construction as above described it will be noted that an independent yielding in a vertical direction of either of the vehicles 1 or 5 is provided, but a lateral or side movement of either of the wagons will impart a like movement to the automobile 5. This is incident to the contacting engagement of the eye 4 with the inner faces of the arms 33 and a like engagement with the pivoted end of the draw bar section 12 with the arms of the bifurcated end of the block 14.

When the train of vehicles have reached their destination the pivot 34 is removed from its connection with the draw bar section 30, thus freeing the automobile 5. The bolt 32 is likewise removed which permits of the draw bar section 30 being swung on its pivot 31 over the draw bar section 12, prior to this the pivot 21 has been also removed and the draw bar section 30 is provided with an opening 35 and is adapted to register with the openings through which the pivot 21 passes. The pivot is reinserted through the opening 35 and the openings in the arms of the biock 14 and plates 8 and 9 and the securing means is attached to the said pivot pin 21. The draw bar is thus brought to the position illustrated in Figure 3 of the drawings so that the same projects only a slight distance beyond the front of the automobile 5 and thus will not in any way interfere with the propulsion or steering of the automobile.

It is, of course, obvious that the bracket can be attached to any of the driven vehicles in the train and that essentially to the bolster of a farm truck or the like.

Having described the invention, I claim:—

1. A draw bar connection between a driven and a drawn vehicle, comprising two sections, each of which is pivotally secured to the respective vehicles but held from lateral movement on their pivots, each of said sections being pivotally connected, means holding the sections in alignment, and one of said sections when released from the vehicle and the holding means between the sections are removed, designed to be swung over and sustained on the other section.

2. A draw bar connection between a driven and a drawn vehicle, comprising a bracket on the driven vehicle, a draw bar section pivotally secured to the bracket and held from lateral movement thereon, a second draw bar section pivotally supported on the drawn vehicle and held from lateral movement thereon, said draw bar sections having lapping ends, a pivot passing through said ends, securing means passing through said ends for holding the draw bar sections in longitudinal alignment, and one of said sections, when removed from the bracket and the holding means between the sections are likewise removed, adapted to be swung over and to be secured on the second draw bar section.

3. A draw bar connection between a driven and a drawn vehicle, including a bracket secured on the driven vehicle, a draw bar section pivotally secured on the bracket but held from lateral movement thereon, a block having an outer bifurcated end and oppositely directed rearwardly extending fingers, which latter are designed to be arranged over and secured to the front axle of the drawn vehicle, a second draw bar section having an end pivotally secured in the bifurcated end of the block, and the confronting ends of the respective draw bar sections being disposed in lapping relation, means pivotally connecting the ends of the said sections, removable means for locking the sections in alignment, and said first mentioned draw bar section, when removed from the bracket, and the securing means between the sections, likewise removed, designed to be swung on its pivot over the last mentioned draw bar section and to be secured on the block.

In testimony whereof I affix my signature.

TONNES AMUNDSON.